United States Patent [19]
Tsubouchi et al.

[11] Patent Number: 5,845,558
[45] Date of Patent: *Dec. 8, 1998

[54] VACUUM SERVO UNIT FOR A VEHICLE BRAKING SYSTEM

[75] Inventors: Kaoru Tsubouchi, Toyota; Akihiko Miwa, Anjo, both of Japan

[73] Assignee: Aisin Seiki Kabushiki Kaisha, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 678,977

[22] Filed: Jul. 12, 1996

[30] Foreign Application Priority Data

Jul. 13, 1995 [JP] Japan ................................. 7-177111
Mar. 12, 1996 [JP] Japan ................................. 8-055025

[51] Int. Cl.$^6$ ........................................................ F15B 9/10
[52] U.S. Cl. ............................................................ 91/376 R
[58] Field of Search ............................. 91/369.1, 376 R, 91/1, 369.2; 60/547.1

[56] References Cited

U.S. PATENT DOCUMENTS

| | | |
|---|---|---|
| 4,756,231 | 7/1988 | Kobayashi et al. . |
| 5,178,441 | 1/1993 | Heibel et al. . |
| 5,207,770 | 5/1993 | Fecher ............................ 91/376 R X |
| 5,460,074 | 10/1995 | Balz et al. . |
| 5,479,844 | 1/1996 | Heibel et al. ................. 91/376 R X |
| 5,493,949 | 2/1996 | Castel et al. ........................ 91/376 R |
| 5,556,173 | 9/1996 | Steiner et al. . |

FOREIGN PATENT DOCUMENTS

| | | |
|---|---|---|
| 136689 | 4/1985 | European Pat. Off. ............. 91/376 R |
| 3627279C2 | 3/1987 | Germany . |
| 3943002A1 | 7/1991 | Germany . |
| 43 24 688 | 1/1995 | Germany . |
| 4338070C1 | 2/1995 | Germany . |
| 44 00 688 | 2/1995 | Germany . |

OTHER PUBLICATIONS

SAE 950761, Rath et al., "Effective Active Safety to Reduce Road Accidents", pp. 35–42, 1995 SAE International Congress and Exposition (No Date).

Primary Examiner—Hoang Nguyen
Attorney, Agent, or Firm—Burns, Doane, Swecker & Mathis, L.L.P.

[57] ABSTRACT

A vacuum servo unit has a housing, a movable wall member, a constant pressure chamber, a variable pressure chamber, a movable power piston, an input member, an output member, a control member, an operation member for applying an axial propulsion on the output member when electric power is supplied thereto, a first input rod connected to a brake operation member, a second input rod, an electric switch member provided on either the first input rod or the second input rod, a switch operate member changing the state of the electric switch member according to a movement of the first input rod against the second input rod. Accordingly, when a driver returns a brake operation member in the condition that the operation member is applying the axial propulsion on the output member, a first input rod is pulled back. Therefore, the first input rod moves respectively to the second input rod, which changes a state of an electric switch member.

12 Claims, 6 Drawing Sheets

VACUUM SERVO UNIT FOR A VEHICLE BRAKING SYSTEM

FIELD OF THE INVENTION

The present invention relates to a vacuum servo unit for a vehicle braking system, and more particularly to a vacuum servo unit or vacuum booster that is automatically operated by the supply of electric power to increase the brake force.

BACKGROUND OF THE INVENTION

A vacuum servo unit for reducing the operating input force to be applied when the vehicle braking system is started has been generally used for some time. This vacuum servo unit includes a constant pressure chamber to which negative pressure is constantly supplied, a variable pressure chamber which in one state is communicated with the atmosphere and is cut off from the constant pressure chamber and in another state is communicated with the constant pressure chamber and is cut off from the atmosphere, a vacuum valve member which intermittently establishes communication between the constant pressure chamber and the variable pressure chamber, and an air valve member which intermittently establishes communication between the atmosphere and the variable pressure chamber. The vacuum valve and the air valve are respectively opened and shut by the operation of a brake operation member, and a pressure differential according to the operation force supplied to the brake operation member is established between the constant pressure chamber and the variable pressure chamber. Therefore, the vacuum servo unit generates an amplified braking force according to the operation force supplied to the brake operation member.

In recent years, a vacuum servo unit employing a solenoid operated by electricity has been known. In this vacuum servo unit, the solenoid moves the air valve member to the open state so that the vacuum servo unit generates a brake force in excess of the brake force corresponding to the input force which is applied to the brake operation member. The foregoing vacuum servo unit is mentioned in, for example, SAE 950761.

FIG. 8 is sectional view of the vacuum servo unit disclosed in SAE 950761. This vacuum servo unit includes an input member 102 that is connected to and moved with an input rod 101, and a plunger member 104 that is moved by the suction produced by a solenoid 103. A power piston 105 is operated according to an operation of the plunger member 104, and a master cylinder piston (not shown) is moved by an output rod 106. The document suggests that a switch member may be formed in the neighborhood between the flange portion 102a of the input member 102 and a contact portion 105a of the power piston 105 in order to detect the return operation of the brake operation member by the driver when the vacuum servo unit is operating automatically by the operation of the solenoid 103.

However, in the foregoing vacuum servo unit, the structure of the input member 102 and the power piston 105 is complex, and the space between the input member 102 and the power piston 105 is restricted. Also, the switch member that detects the movement of the input member 102 against the power piston 105 is placed in the region between the input member 102 and the power piston 105. As a result of the restricted space, the structure of other members must be altered to set up the switch member. This increases the cost associated with providing the other members with the necessary strength and function. Further, the structure of the vacuum servo unit is made more complex.

SUMMARY OF THE INVENTION

Accordingly, a need exists for a vacuum servo unit that is able to obviate the aforementioned drawback associated with conventional vacuum servo units. That is, a need exists for a vacuum servo unit which has a simple structure, is relatively low in cost and can be automatically operated.

In light of the foregoing, an aspect of the present invention involves a vacuum servo unit for a vehicle braking system that includes a housing in which is defined a pressure chamber, a movable wall provided in the housing to divide the pressure chamber into a constant pressure chamber adapted to communicate with a negative pressure source and a variable pressure chamber adapted to selectively communicate with atmosphere or with the negative pressure source, and a movable power piston integrally connected with the movable wall member. An input member is provided in the movable power piston and is axially movable in response to brake actuation, and an output member outputs a force in response to movement of the movable power piston. A control member for selectively communicating the variable pressure chamber with the negative pressure source or with the atmosphere according to movement of the input member against the movable power piston. An operation member applies an axial force to the output member when electric power is supplied to the operation member. A first input rod has one end portion connected with a brake operation member, and a second input rod has one end portion connected with the input member and an opposite end portion connected with the opposite end portion of the first input rod. The second input rod is adapted to be displaced relative to the first input rod, and the second input rod transmits force between the input member and the first input rod. An electric switch member is provided on one of the first input rod and the second input rod, and the electric switch member is operable between different states. A switch operation member changes the state of the electric switch member according to movement of the first input rod relative to the second input rod.

In the foregoing the vacuum servo unit, when the driver returns the brake operation member, for example the brake pedal, during the automatic operation of the vacuum servo unit, i.e. the operation member is applying the axial propulsion force to the output member, the first input rod is pulled back by the biasing force of a return spring. Therefore, the first input rod moves relative to the second input rod which changes the state of the switch member.

According to the vacuum servo unit as structured above, a cord that transmits a signal sent by the switch member can be taken out from the rear end portion of the vacuum servo unit, and it is not necessary that the cord pass through a seal member. Therefore, the structure of the vacuum servo unit is simplified.

BRIEF DESCRIPTION OF THE DRAWING FIGURES

The foregoing and other features will become more readily apparent from the following description considered with reference to the accompanying drawing figures in which like elements are designated by like reference numerals and wherein.

DETAILED DESCRIPTION OF THE PREFERRED EMBODIMENTS

Figure 1:
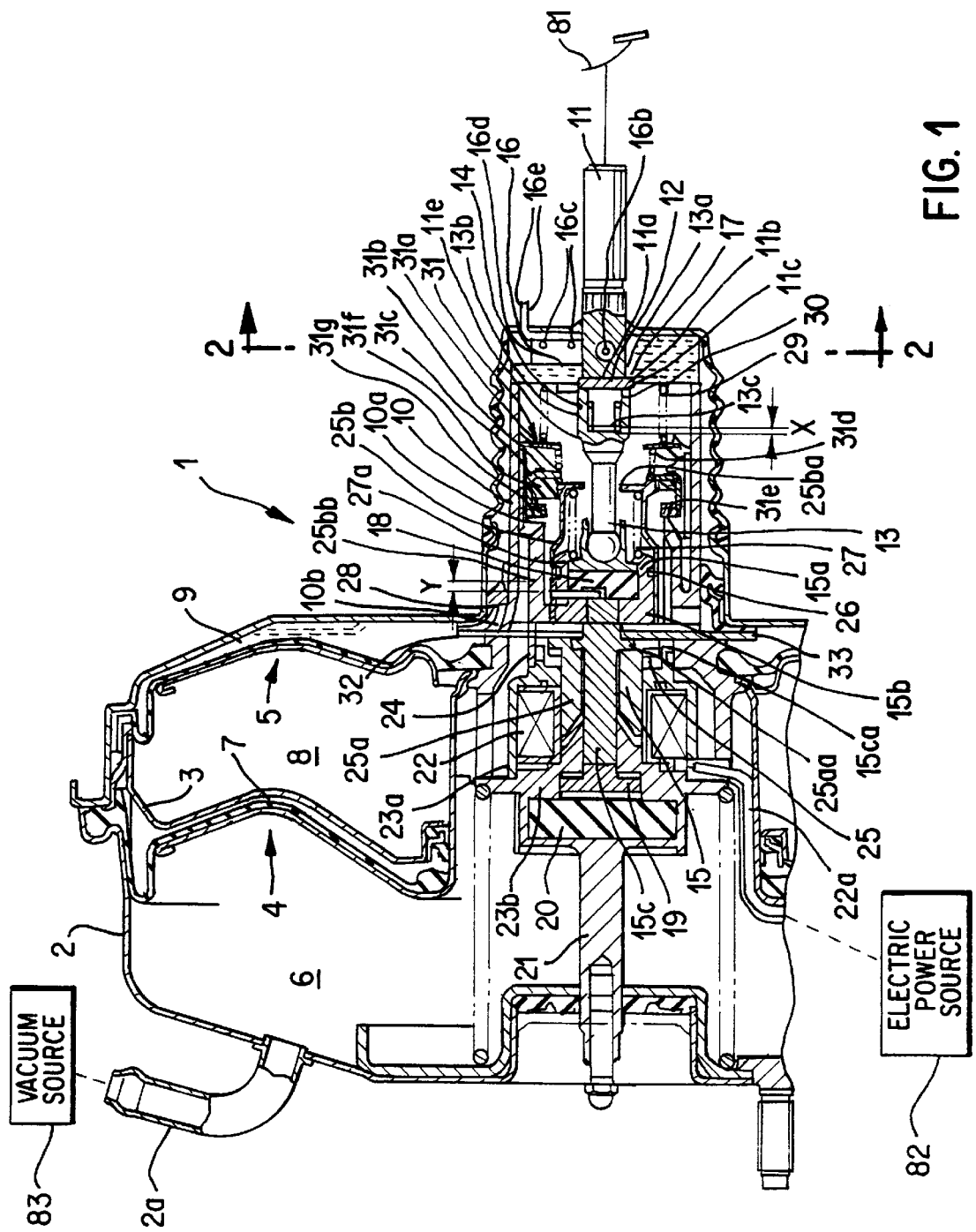
FIG. 1 is a cross-sectional view of a vacuum servo unit according to a first embodiment of the present invention.

Referring to FIG. 1, there is illustrated a vacuum servo unit according to a first embodiment of the present invention applied to a tandem-type vacuum servo unit. In FIG. 1, an automatically operable vacuum servo unit 1 has a housing 2 that defines a pressure chamber. In the housing 2, the outer peripheral portion of a partition wall member 3 is fixed in an air tight manner to the inside of the housing 2, the outer peripheral portion of an axially movable front movable wall member 4 is fixed in an air tight manner to the inside of the housing 2, and a rear movable wall member 5 substantially the same as the front movable member 4 is provided. The pressure chamber in the housing 2 is divided in an air tight manner into a front constant negative pressure chamber 6, a rear constant negative pressure chamber 8, a front variable pressure chamber 7, and a rear variable pressure chamber 9. These chambers 6, 7, 8, 9 are divided by way of the partition wall member 3, the front movable wall member 4, and the rear movable wall member 5. The front constant pressure chamber 6 and the rear constant pressure chamber 8 are adapted to communicate, through an inlet 2a, with a vacuum source 83 such as a negative pressure source, for example the intake manifold of an internal combustion engine.

A movable power piston 10 is inserted in the housing 2 from the rear portion of the housing 2 and the inner peripheral end portions of both the front movable wall member 4 and the rear movable wall member 5 are connected in an air tight manner with the power piston 10. The power piston 10 contacts the inner peripheral end portion of the partition wall member 3 in an air tight manner and can slide on the inner peripheral end portion of the partition wall member 3.

A first input rod 11 has a right end portion shown in FIG. 1 that is connected with a brake operation member, for example, a brake pedal 81. The first input rod 11 is inserted in the power piston 10. An axially extending slit 11a is formed in the first input rod 11, and an axially movable connect pin member 12 is inserted in the slit 11a. The connect pin member 12 is fixed to a hole 13a formed with the second input member 13 so as to be immovable relative to the second input rod 13.

The left side portion of the first input rod 11 is inserted into a hollow 13b formed in the right side portion of the second input rod 13, and the outer peripheral portion of the left side portion of the first input rod 11 contacts the inner peripheral portion of the right side portion of the second input rod 13. A spring 14 is provided between the surface of the large diameter portion of the left side portion of the first input rod 11 and the bottom portion 13c of the hollow 13b to bias the first input rod 11 and the second input rod 13 so that the first input rod 11 and the second input rod 13 are urged away from each other. The second input rod 13 is connected with the input portion 15a of a first input member 15 so that the two are capable of moving as one body.

Figure 2:
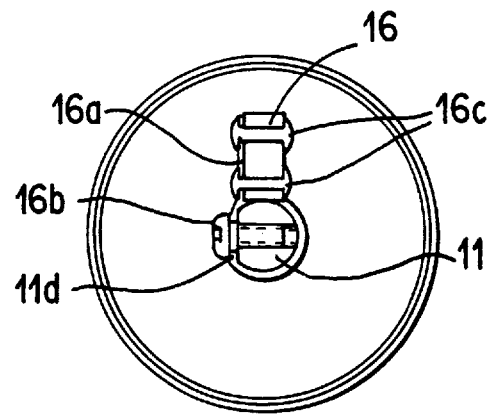
FIG. 2 is a cross-sectional view along the section line 2—2 in FIG. 1.
Figure 4:
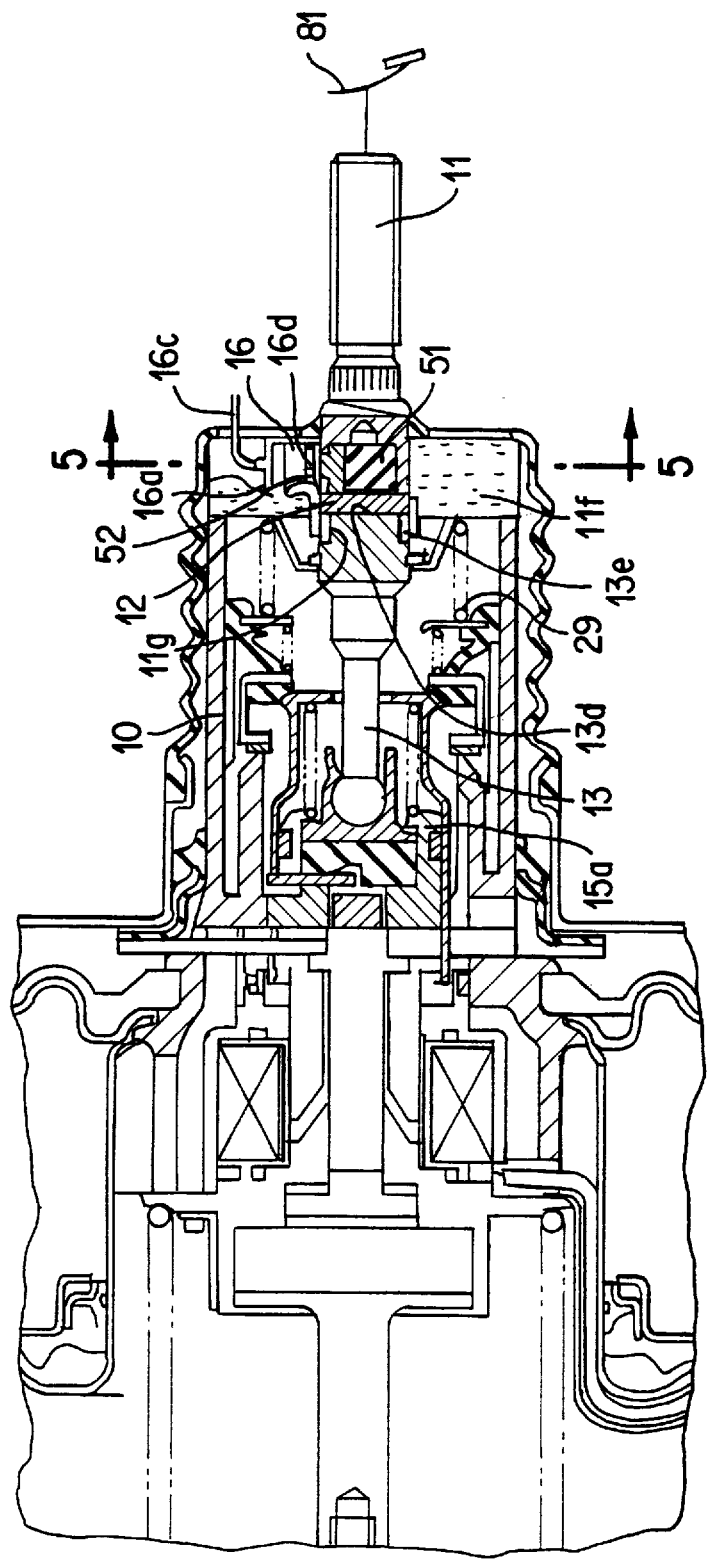
FIG. 4 is a cross-sectional view of a vacuum servo unit according to a second embodiment of the present invention.

A bracket 16a is bound around the outer peripheral portion of the middle region of the first input rod 11 and is fixed to the plain portion 11d of the middle region of the first input rod 11 by a screw 16b. A micro switch 16 such as an electric switch member is fixed to the upper portion of the bracket 16a by two rivets 16c as seen in FIG. 2. The micro switch 16 has an operation portion 16d as seen in FIG. 4 which transmits an electric signal during operation and a cord 16e to transmit the electric signal outside. A contact member 17 such as a switch change member is fixed to the connect pin member 12 so as to be capable of contacting the operation portion 16d of the micro switch 16.

In the non-operating state of the brake system, the position of the first input rod 11 is determined by the brake pedal 81, the position of the second input rod 13 is determined by the first input member 15, and a clearance shown as "X" in FIG. 1 is established between the left end portion 11e of the input rod 11 and the bottom portion 13c of the second input rod 13. In this case, the micro switch 16 is in the non-operating state because there is a little clearance between the operation portion 16d of the micro switch 16 and the contact member 17 fixed to the connect pin member 12.

The first input member 15 comprises the input portion 15a, a middle portion 15b and an output portion 15c. An elastic member 18 contacts the input portion 15a, the middle portion 15b contacts the elastic member 18, the output portion 15c is screwed into the middle portion 15b, and a second input member 19 contacts the output portion 15c, and all play a role in transmitting the brake operating force from the first input member 15 to a reaction disc 20 such as a reaction member. An output rod 21 such as the output member contacting the reaction disc 20 moves to operate a master cylinder piston (not shown) when the output rod 21 receives the brake operation force through the reaction disc 20.

An electronic solenoid 22 constituting a solenoid valve is fixed in a first fixed member 23a made of iron. The first fixed member 23a is fixed in an air tight manner to the power piston 10 through a seal member 24. A second fixed member 23b also made of iron is located in the first fixed member 23a.

The solenoid 22 is connected to an electric power source 82 of the vehicle by a cord 22a and is adapted to generate an electromagnetic force by the supply of electric power from the electric power source 82 through the cord 22a.

A plunger member 25 forming part of the solenoid valve comprises a first plunger portion 25a and a second plunger portion 25b for reason of assembly. The first plunger portion 25a and the second plunger portion 25b are fixed to each other by being put into one another or by being screwed to each other. The plunger member 25 is in air tight engagement with the middle portion 15b of the first input member 15 at an inner peripheral portion of the second plunger portion 25b through a seal member 26, and is movable relative to the middle portion 15b.

A snap ring 27a is set up in the middle portion 15b of the first input member 15. A spring 27 is provided between the snap ring 27a and an inner flange portion 25ba formed in the second plunger portion 25b. A flange portion 15ca is formed at the output portion 15c of the first input member 15 and is in engagement with a shoulder portion 25aa formed in the first plunger portion 25a.

Therefore, in the non-operating state of the second input rod 13, the plunger member 25 is biased toward the right in FIG. 1 by the spring 27 and is kept in a stationary state by the engagement of the first plunger portion 25a and the flange portion 15ca.

A lever 28 provided between the elastic member 18 and the middle portion 15b of the first input member 15 plays a roll in transmitting the brake operation force with the first input member 15 and functions to adjust the amount of boosting of the vacuum servo unit 1. The lever 28 is inserted into a hole 25bb provided in the second plunger 25b, and a clearance "Y" is established between the lever 28 and the hole 25bb of the second plunger member 25b.

A spring retainer 30 that receives a return spring 29 is fixed in the connect pin member 12. A first retainer 31a that forms a valve member 31 such as a control member is fixed in the power piston 10 and receives the resilience from the second input rod 13 through the spring retainer 30 and the return spring 29. One end portion of a seal member 31b is in engagement with the first retainer 31a and the other end portion of the seal member 31b is formed integrally with a spring retainer 31c. A valve spring 31d is provided between the first retainer 31a and the spring retainer 31c. A valve plate 31e is fixed in the spring retainer 31c, and an air valve member 31f and a vacuum valve member 31g are fixed respectively to the spring retainer 31c and the valve plate 31e so as to be formed integrally.

By virtue of the aforementioned construction, the air valve member 31f is in engagement with the second plunger portion 25b in the non-operation state of the second input rod 13. In the operation state of the second input rod 13, the vacuum valve member 31g can be in engagement with a valve seat 10a formed on the end of the power piston 10. A stopper member 32 is inserted into a stopper groove provided in the power piston 10 and contacts the housing 2 through a damper member 33.

The operation of the vacuum servo unit 1 is as follows. In the situation where the brake operation member is not operated by the driver, i.e., in the state shown in FIG. 1, the air valve member 31f is in engagement with the second plunger member 25b and the vacuum valve member 31g is out of engagement with the valve seat 10a. Therefore, the front variable pressure chamber 7 and the rear variable pressure chamber 9 communicate with the vacuum power source 83, such as the intake manifold of the internal combustion engine, through the front constant pressure chamber 6.

When the brake operation member of the vehicle, for example the brake pedal 81, is actuated by the driver, the first input rod 11 connected with the brake pedal 81 receives the brake operation force and moves towards the left side in FIG. 1. The brake operation force applied to the first input rod 11 through the brake pedal 81 overcomes the preset biasing force of the spring 14, and the first input rod 11 and the second input rod 13 approach each other to reduce the clearance "X" initially established between the two input rods 11, 13. When the left end portion 11e of the first input rod 11 contacts the bottom portion 13c of the second input rod 13, the clearance "X" is completely filled up (i.e., is eliminated). Thus, the first input rod 11 pushes the second input rod 13 toward the left in FIG. 1 and so the first input rod 11 and the second input rod 13 move integrally as one towards the left.

As the clearance "X" is filled up or eliminated by the operation of the first input rod 11, the micro switch 16 fixed to the first input rod 11 moves towards the contact member 17 fixed to the second input rod 13, and the contact member 17 contacts the operation portion 16d. The contact member 17 pushes the operation portion 16d to operate the micro switch 16, and the micro switch 16 transmits an electric signal.

The plunger 25 is also moved towards the left by the contact between the flange portion 15ca and the shoulder portion 25aa accompanying the movement of the first input rod 11. Both the air valve member 31f and the vacuum valve member 31g move towards the left with the plunger 25 by the biasing force of the valve spring 31d. The vacuum valve member 31g then contacts the valve seat 10a of the power piston 10, which cuts off communication between the front variable pressure chamber 7, the rear variable pressure chamber 9, the front constant pressure chamber 6, and the rear constant pressure chamber 8. Therefore, the communication between the front variable pressure chamber 7, the rear variable pressure chamber 9 and the vacuum source is cut off.

As the plunger 25 moves further towards the left in FIG. 1, the engagement between the air valve member 31f and the plunger 25 ceases so that the front variable pressure chamber 7 and the rear variable pressure chamber 9 communicate with the atmosphere. Therefore, a pressure differential is generated between the front constant pressure chamber 6 and the front variable pressure chamber 7, as well as between the rear constant pressure chamber 8 and the rear variable pressure chamber 9 by the inflow of atmospheric air into the variable pressure chambers 7, 9. The front movable wall 4 as well as the rear movable wall 5 receive the load force created by the difference in pressure, and the power piston 10 connected with the movable walls 4, 5 applies the amplified brake force to the output rod 21 through the reaction disc 20. After this, either the air valve member 31f and the plunger 25 or the vacuum valve 31g and the valve seat 10a are in the engaged state selectively by the reaction force that the second input rod 13 and the first input rod 11 receives from the reaction disc 20 through the second input member 19 and the first input member 15. The servo force of the vacuum servo unit 1 is controlled according to the driver's brake operation force applied to the first input rod 11. The operational characteristics of aforementioned the vacuum servo unit 1 is shown as a line "P" in FIG. 3.

The existence of an urgent brake operation is determined when the micro computer (not shown) detects that the brake pedal has been operated faster than the pre-set value of the pedal stroke speed according to the pedal stroke value detected by the pedal stroke switch (not shown) provided with the brake pedal, or when the existence of an obstacle is detected by the picture disposal of the CCD camera or the distance measuring sensor. At this time, the first input rod 11 is operated by a brake force larger than the pre-set value and the brake pedal operation is detected by the micro switch 16, the necessity of the urgent brake operation is judged, and the solenoid 22 is supplied with electric power from the electric power source 82 through the cord 22a apart from the brake operation by the driver. At this point the force from the input member 15 of the first input member 11 acts on the elastic member 18, and the clearance between the elastic member 18 and the lever 28 is filled up or eliminated, and the lever 28 is kept in the state shown in FIG. 1.

The solenoid 22 supplied with electric power generates an electromagnetic force to make the plunger 25 move towards the left in FIG. 1 against the biasing force of the biasing spring 27 and the frictional resistance between the plunger 25 and the seal member 26 apart from the operation of the first input rod 11. Meanwhile, the air valve member 31f and the vacuum valve member 31g are biased by the valve spring 31d to move towards the left in FIG. 1 according to the movement of the plunger 25, so that the air valve member 31f and the vacuum valve member 31g move the length of the clearance "Y" between the lever 28 and the plunger 25.

The vacuum valve member 31g is in engagement with the valve seat 10a, and the air valve member 31f is out of engagement with the plunger 25. Therefore, communication between the variable pressure chambers 7, 9 and the vacuum source 83 is cut off and the variable pressure chambers 7, 9 communicate with the atmosphere. The power piston 10 gives the output rod 21 the brake force by the inflow of the atmosphere to the variable pressure chambers 7, 9, which makes the master cylinder piston (not shown) operate, and the brake pressure is produced in the master cylinder.

The reaction force according to the brake pressure generated in the master cylinder and the brake operation force generated by the operation of the brake pedal 81 and transmitted to the second input member 19 are respectively applied to both sides of the reaction disc 20. Thus, the reaction force and the brake operation force are balanced. The operational characteristics at this time are shown as a line "Q" in FIG. 3.

When the driver judges that there is no need for a brake operation and the brake pedal is returned, the plunger 25 kept in contact with the lever 28 moves toward the right integrally with the first input member 15 according to the returning of the second input rod 13. The air valve member 31f the second plunger 25b and the vacuum valve member 31g moves out of engagement with the valve seat 10a of the power piston 10. Consequently, the communication between the variable pressure chambers 7, 9 and the atmosphere is cut off, and the variable pressure chambers 7, 9 communicate with the constant pressure chambers 6, 8, so that the degree of the aggressive pressure in the variable pressure chambers 7, 9 decreases and the servo force to the power piston 10 decreases. In this way, the brake force decreases along the line "Q" in FIG. 3.

Figure 3:
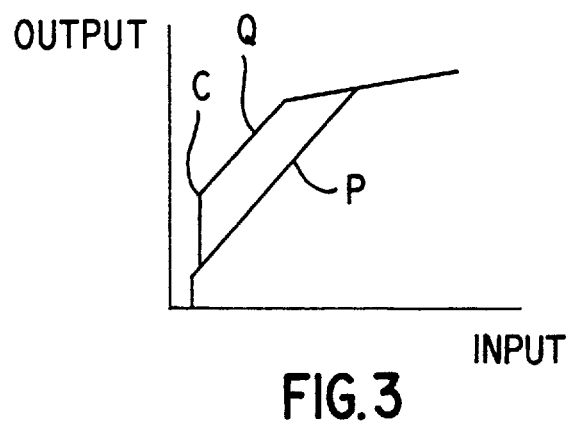
FIG. 3 is a graph showing the performance of a vacuum servo unit according to an embodiment of the present invention.

When the brake operation force applied to the first input rod 11 decreases under the pre-set load force of the spring 14, i.e. in FIG. 3 it reaches the point "C", the biasing force of the spring 14 separates the first input rod 11 and the second input rod 13. Therefore, the contact between the contact portion 17 and the operation portion 16d of the micro switch 16 is canceled, and the electric signal produced by the micro switch 16 ceases. When the micro switch 16 detects that the electric signal of the micro switch 16 has ceased, the supply of electric power from the electric power source 82 to the solenoid 22 is stopped. Therefore, the solenoid 22 does not generate electromagnetic force to the plunger 25, and the plunger 25 is returned towards the right side in FIG. 1 by the biasing force of the biasing spring 27. According to the movement of the plunger 25 towards the right, the air valve member 31f becomes engaged with the plunger 25 and is returned towards the right side in FIG. 1 and the vacuum valve member 31g comes out of engagement with the valve seat 10a of the power piston 10. Therefore, the communication between the variable pressure chambers 7, 9 and the atmosphere is cut off and the variable pressure chambers 7, 9 communicate with the vacuum source 83 of the vehicle, so that the differential pressure between the variable pressure chambers 7, 9 and the constant pressure chambers 6, 8 decreases. Thus, the operation state of the vacuum servo unit 1 comes back to the state in which it is in the normal brake operation line "P", and after this, the operation comes back in the first state according to the decrease of the input force.

In the first embodiment mentioned above, the plunger is moved toward the master cylinder side by the solenoid, but the vacuum servo unit is not limited to the this construction and can be applied to a vacuum servo unit in which the plunger is moved toward the brake pedal 81 side.

As mentioned above, in the vacuum servo unit, the switch member that detects the returning operation of the brake pedal is set up in the neighborhood of the input rod, which does not influence the other members. The cord that transmits the signal sent by the switch member can be taken out from the rear end portion of the vacuum servo unit since the cord does not need to pass through a seal member. Accordingly, the composition of the unit is simple, and a low cost unit can be supplied.

Figure 5:
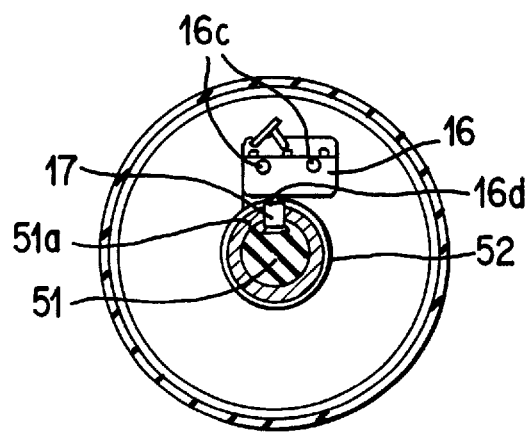
FIG. 5 is a cross-sectional view along the section line 5—5 in FIG. 4.

FIGS. 4 and 5 illustrate a second embodiment of the present invention, wherein elements similar to those in the first embodiment are identified with the same reference number. The following description will focus primarily on the differences with respect to the first embodiment.

In FIG. 4, the insert hole 11f is provided in the first input rod 11 connected with the brake pedal 81 at the right side end thereof, and the connect pin member 12 is immovably fixed to the insert hole 11f. The connect pin member 12 is inserted in the axially extending slit 13d provided in the second input rod 13, and the second input rod 13 is axially movable towards the first input rod 11.

The right side portion of the second input rod 13 is inserted into a hollow 11g formed in the right side portion of the first input rod 11, and the outer peripheral portion 13e of the right side portion of the second input rod 13 contacts the inner peripheral portion of the right side portion of the first input rod 11. The second input rod 13 is connected with an input portion 15a of the first input member 15 so as to be capable of moving as one body.

A bracket 16a is bound around the outer peripheral portion of the middle portion of the first input rod 11. A micro switch 16 such as an electric switch member is fixed to the upper portion of the bracket 16a by two rivets 16c in FIG. 5. The micro switch 16 has an operation portion 16d to transmit an electric signal when the micro switch 16 is pushed and a cord 16e to transmit an electric signal outside. An elastic member 51 made of rubber or the like and constituting a part of the switch operating member is received in the hollow 11g, and the right side end thereof contacts the right side end of the second input rod 13. A contact member 17 constituting a part of the switch operation member is glued or welded in the plane portion 51a of the elastic member 51, and a spring 52 like a ring, constituting a portion of a switch operation member, is provided between the contact member 17 and the operation portion 16d of the micro switch 16.

In the operating state of the brake pedal 81, the first input rod 11 presses the elastic member 51 between the first input rod 11 and the second input rod 13, and moves toward the left relative to the second input rod 13. The elastic member 51 is pressed to expand toward the outside in the radial direction and opens the spring 52 towards the outside in the radial direction through the contact portion 17, and the contact portion 17 pushes the operation portion 16d of the micro switch 16 to operate the micro switch 16.

The other actions and effects are similar to those in the first embodiment and so on explanation is omitted.

In the second embodiment mentioned above, the magnitude of the input force to be applied to the brake pedal 81 for changing the micro switch 16 depends upon the bound force magnitude of the elastic member 51. The bound force magnitude of the elastic member 51 can be set up by changing, for example, the hardness characteristics of the elastic member 51. Thus, be altering such characteristics of the elastic member 51, the magnitude of the input force applied to the brake pedal 81 to change the micro switch 16 can be varied.

Figure 6:
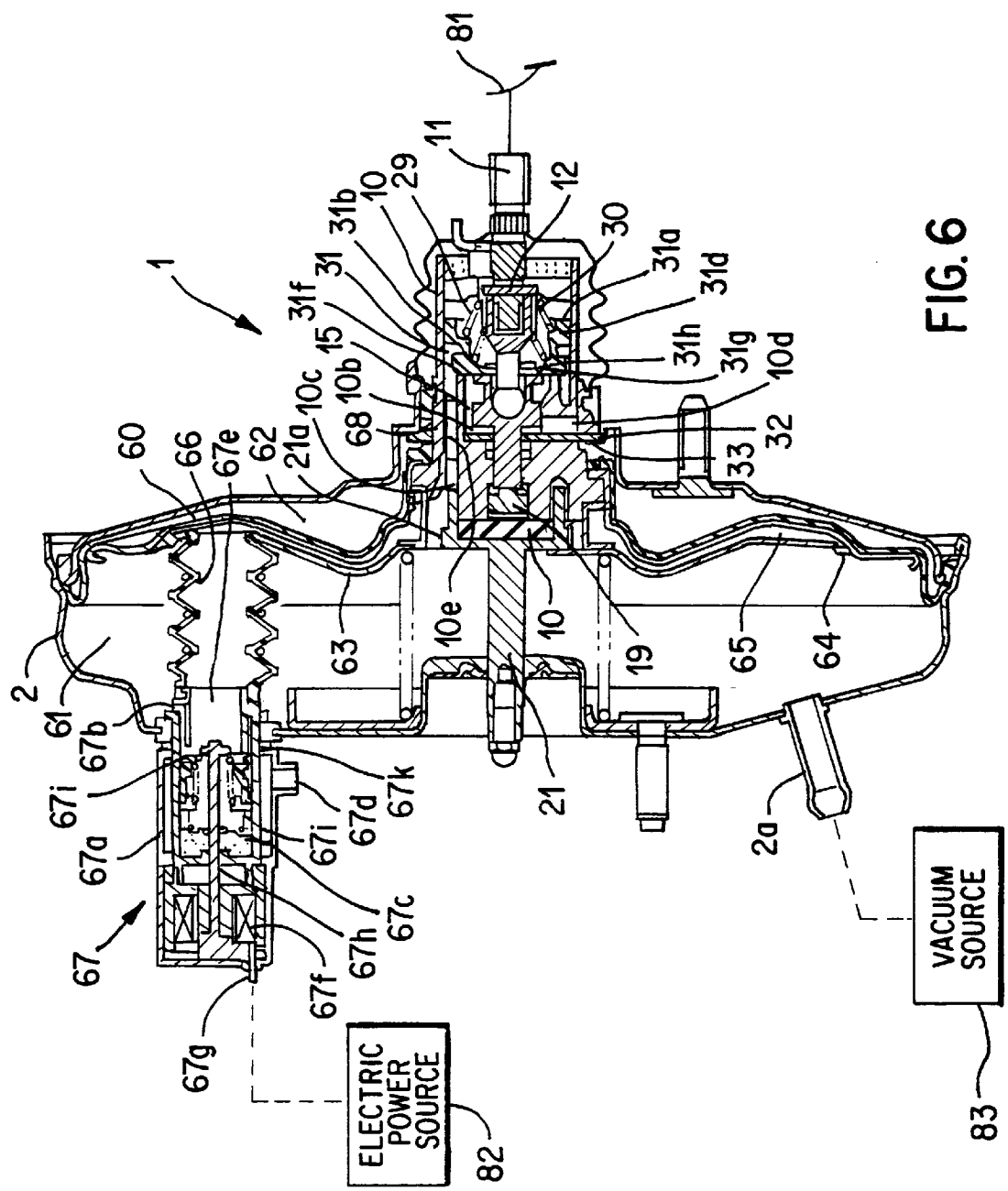
FIG. 6 is a cross-sectional view of a vacuum servo unit according to a third embodiment of the present invention.

FIG. 6 illustrates the third embodiment of the present invention, wherein features similar to those in the first embodiment are identified by the same reference number.

In FIG. 6, the automatically operable vacuum servo unit 1 has a housing 2 that defines a pressure chamber. In the housing 2, the outer peripheral portion of a movable wall member 60 is fixed in an air tight manner to the inside of the housing 2 and is movable in the axial direction. The pressure chamber in the housing 2 is divided in an air tight manner into a constant negative pressure chamber 61 and a variable pressure chamber 62 by means of the movable wall member 60. The constant pressure chamber 61 is adapted to communicate with a vacuum source 83, such as an intake manifold of an internal combustion engine, through an inlet 2a and constantly generates negative pressure.

A power piston 10 made of a resin is inserted in the housing 2 from the rear portion of the housing 2 and the inner peripheral portion of the movable wall member 60 is connected in an air tight manner with the power piston 10.

An input rod 11 whose right end portion in FIG. 6 is connected with a brake operation member, for example a brake pedal 81, is inserted in the power piston 10. The input rod 11 is connected with the first input member 15 so that the two are capable of moving together as one body.

The first input member 15 and the second input member 19 which contacts the first input member 15 play a roll in transmitting the brake operation force to the reaction disc 10. An output rod 21 contacting the reaction disc 20 moves by receiving the brake operation force through the reaction disc 20 to operate a master cylinder piston (not shown).

A spring retainer 30 that receives a return spring 29 is fixed in the connect pin member 12. A first retainer 31a that forms a valve member 31 such as a control member is fixed in the power piston 10 receiving the resilience from the input rod 11 through the spring retainer 30 and the return spring 29. The inner peripheral portion of the right end portion of a seal member 31b is in engagement with the first retainer 31a, the outer peripheral portion of the right end portion of the seal member 31b functions as a seal with the inner peripheral surface of the power piston 10, and the left end portion of the seal member 31b is glued to the second retainer 31h. A valve spring 31d is provided between the retainer 30 and the second retainer 31b. At the left end portion of the seal member 31b, the air valve portion 31f for contacting the right end portion of the first input member 15 and the vacuum valve portion 31g for contacting the valve seat 10a of the power piston 10 are formed respectively.

By virtue of the aforementioned construction, the air valve portion 31f is in engagement with the first input member 15 in the non-operation state of the input rod 11. In the operation state of the input rod 11, the vacuum valve portion 31g engages the valve seat 10a formed on the power piston 10. A stopper member 32 is inserted into a stopper groove 10b, and the stopper member 32 contacts the housing 2 through a damper member 33. Moreover, the power piston 10 has a first air pass 10c and the second air pass 10d to make the constant pressure chamber 61 communicate with the variable pressure chamber 62 in the condition that the vacuum valve portion 31g is out of engagement with the valve seat 10a of the power piston 10.

The partition member 63 whose inner peripheral portion is in air tight engagement with the power piston 10 through the O ring 21a serving as a seal member is provided in the constant pressure chamber 61. The outer peripheral portion of the partition member 63 is in air tight engagement with the variable wall member 60 with the seal member 64, and an atmosphere introduction room 65 is formed between the partition member 63 and the variable wall member 60.

An atmosphere introduction root 66 that can expand and contract is provided in the constant pressure chamber 61. One end portion of the atmosphere introduction root 66 is connected in an air tight manner with the partition member 63 and the other end portion communicates with a solenoid valve 67 that is in air tight engagement with the front face of the housing 2.

The solenoid valve 67 has a constant pressure port 67b that communicates with the constant pressure chamber 61, an atmosphere port 67d that communicates with a cleaner member 67c, and a variable pressure port 67e that communicates with the atmosphere introduction root 66 in a valve housing 67a. The solenoid valve 67f is connected with the electric power source 82 of the vehicle by a cord 67g and is supplied with electric power from the electric power source 82 by a controller (not shown) to be operated.

A plunger 67h is provided in the solenoid 67f and is biased toward the left in FIG. 6 by a spring 67i to contact an atmospheric valve 67i. In this condition, because the atmospheric valve 67i is out of engagement with the constant pressure valve 67k, the atmosphere introduction room 65 communicates with the constant pressure chamber 61 through the inside of the atmosphere introduction root 66, the variable pressure port 67e, and the constant pressure port 67b.

A one way valve 68, which permits atmospheric air flow in the direction from the air passage 10c to the variable pressure chamber 62, and a hole 10e set up in the radial direction in the power piston 10 are provided between the air passage 10c and the variable pressure chamber 62 to secure communication between the atmosphere introduction room 65 and the variable pressure chamber 62 when the vacuum valve portion 31g is in engagement with the valve seat 10a of the power piston 10.

When the solenoid 67f is supplied with electric power from the electric power source 82 by the controller (not shown), the solenoid 67f biases the plunger 67h towards the right in FIG. 6 so that the atmosphere valve 67i is in engagement with the constant pressure valve seat 67k and the atmosphere valve 67j is out of engagement with the plunger 67h. Therefore, atmospheric air is introduced to the atmosphere introduction room 65 through the inside of the atmosphere introduction root 66, the variable pressure port 67e, the air cleaner member 67c, and the atmosphere pressure port 67d.

Figure 7:
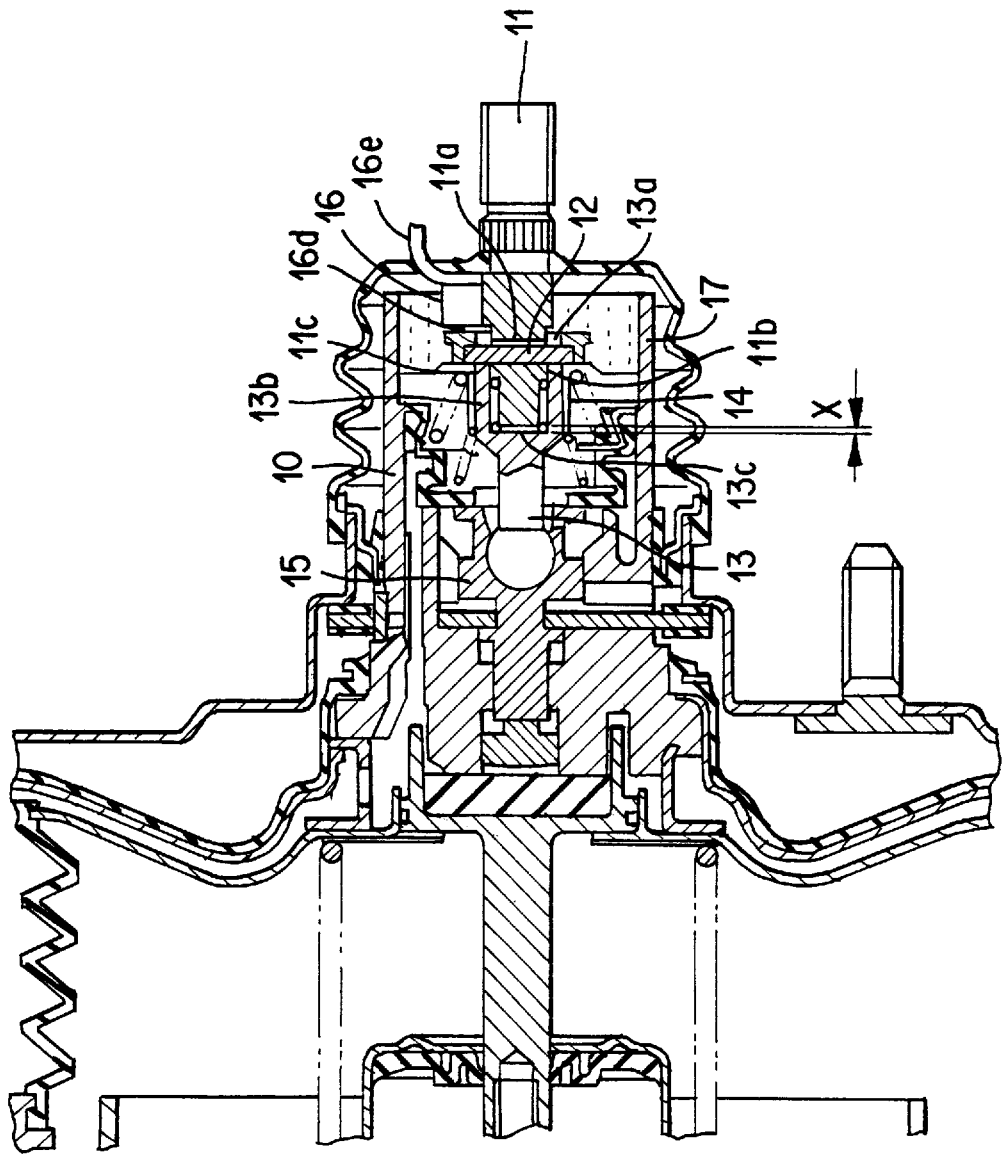
FIG. 7 is an enlarged cross-sectional view of a part of a vacuum servo unit shown in FIG. 6.
Figure 8:
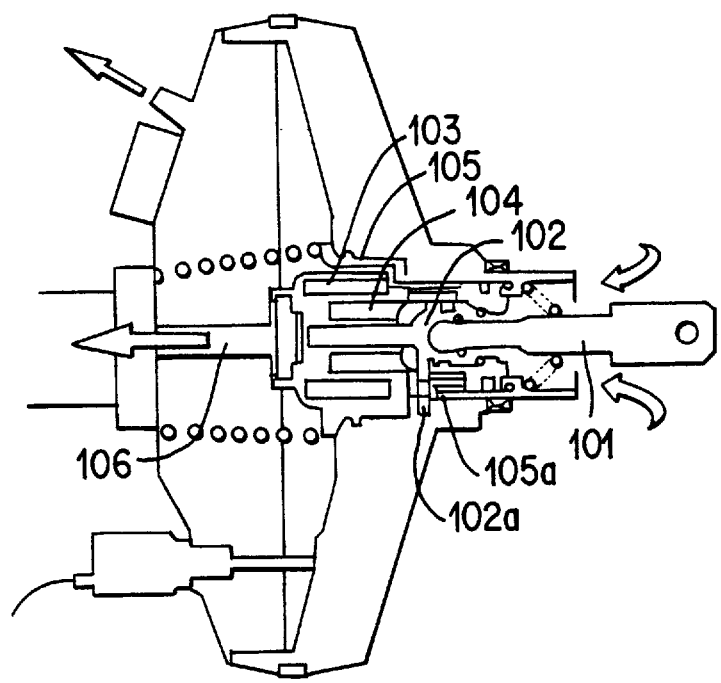
FIG. 8 is a cross-sectional view of a conventional vacuum servo unit.

As seen in FIG. 7, a slit 11a extending in the axial direction is provided in the first input rod 11, and the connect pin member 12 is inserted into the slit 11a to permit movement in the axial direction. The connect pin member 12 is fixed in a hole 13a provided in the second input rod 13 and so cannot be moved relative to the second input rod 13.

The left side portion of the first input rod 11 is inserted into a hollow 13b formed in the right side portion of the second input rod 13, and the outer peripheral portion of the left side portion of the first input rod 11 contacts the inner peripheral portion of the right side portion of the second input rod 13. A spring 14 is provided between the surface of the large diameter portion of the left side portion of the first input rod 11 and the bottom portion 13c of the hollow 13b to bias the first input rod 11 and the second input rod 13 in a direction away from one another. The second input rod 13 is connected with the first input member 15 so that the two are capable of moving as one body.

A bracket is bound around the outer peripheral portion of the mid portion of the first input rod 11, and a micro switch 16 such as an electric switch member is fixed to the upper portion of the bracket. The micro switch 16 has an operation portion 16d to transmit an electric signal during operation and a cord 16e to transmit the electric signal outside. A contact member 17 such as a switch change member is fixed to the connect pin member 12 so as to be capable of contacting the operation portion 16d of the micro switch 16.

In the non-operating state of the brake system, the position of the first input rod 11 is determined by the brake pedal 81 and the position of the second input rod 13 is determined by the first input member 15, and a clearance shown as "X" in FIG. 7 is established between the left end portion of the input rod 11 and the bottom 13c of the second input rod 13. In this case, the micro switch 16 is in the non-operating state because there is a little clearance between the operation portion 16d of the micro switch 16 and the contact member 17 fixed to the connect pin member 12.

The operation of the vacuum servo unit 1 is as follows. In the situation where the brake operation member 81 is not operated by the driver, i.e., in the state shown in FIG. 6, the air valve portion 31f of the valve member 31 is in engagement with the first input member 15, and the vacuum valve portion 31g is out of engagement with the valve seat 1a of the power piston 10. Thus, the variable pressure chamber 62 is in communication with the vacuum power source 83 such as the intake manifold of the internal combustion engine through the constant pressure chamber 61.

When the brake operation member of the vehicle (e.g., the brake pedal 81) is actuated by the driver, the first input rod 11 connected with the brake pedal 81 receives the brake operation force to move towards the left as seen in FIG. 6. The brake operation force applied to the first input rod 11 through the brake pedal 81 overcomes the pre-set biasing force of the spring 14, and the first input rod 11 and the second input rod 13 approach each other to fill up or reduce the clearance "X" established between the first input rod 11 and the second input rod 13. The left end portion of the first input rod 11 then contacts the bottom portion 13c of the second input rod 13 so that the clearance "X" is filled up entirely or eliminated. Thus, the first input rod 11 pushes the second input rod 13 toward the left as seen in FIG. 6, and the first input rod 11 and the second input rod 13 move integrally towards the left.

The clearance "X" is filled up or eliminated by the operation of the first input rod 11, and the micro switch 16 fixed to the first input rod 11 moves towards the contact member 17 fixed to the second input rod 13, and the contact member 17 contacts the operation portion 16d. The contact member 17 pushes the operation portion 16d to effect operation of the micro switch 16, and the micro switch 16 transmits the electric signal.

The air valve portion 31f and the vacuum valve 31g also are moved towards the left by the biasing force of the valve spring 31d according to the movement of the first input rod 11. The vacuum valve member 31g then contacts the valve seat 10a of the power piston 10, which cuts off communication between the variable pressure chamber 62 and the constant pressure chamber 61. Therefore, communication between the variable pressure chamber 62 and the vacuum source 83 is cut off.

The first input member 15 is moved towards the left in FIG. 6, and the engagement between the air valve portion 31f and the first input member 15 ceases so that the variable pressure chamber 62 communicates with the atmosphere. Therefore, a pressure differential is generated between the constant pressure chamber 61 and the variable pressure chamber 62 by the inflow of atmospheric air into the variable pressure chamber 62. The movable wall 63 receives the load force created by the pressure differential and the power piston 10 connected with the movable wall 63 applies the amplified brake force to the output rod 21 through the reaction disc 20. After this, either the air valve portion 31f and the first input member 15 or the vacuum valve portion 31g and the valve seat 10a are in the engagement state by the reaction force that the input rod 11 receives through the second input member 19 and the first input member 15. The servo force of the vacuum servo unit 1 is controlled according to the driver's brake operation force applied to first input rod 11.

The reaction force according to the brake force generated by the power piston 10 and the brake operation force generated by the operation of the brake pedal 81 and transmitted to the second input member 19 are applied to both sides of the reaction disc 20 respectively, and the reaction force and the brake operation force are balanced.

In this condition, because the solenoid 67f is in the non-operating condition, the atmosphere introduction room 65 communicates with the constant pressure chamber 61. Therefore, the pressure of the variable pressure chamber 62 equals the pressure of the constant pressure chamber 61, and the movable wall 63 is in the non-operation state.

In the case where an urgent brake operation is needed such as when the existence of an obstacle is detected by the picture disposal of the CCD camera or the distance measuring sensor, the solenoid 67 is supplied with electric power from the electric power source 82 apart from the brake operation by the driver. The solenoid 67 supplied with the electric power generates electromagnetic power to make the plunger 67h move towards the right in FIG. 6 against the biasing force of the spring 67i.

In the same manner as described above, atmospheric air is introduced to the atmosphere introduction room 65 according to the movement of the plunger 67h, so that the atmospheric air is introduced to the variable pressure chamber 62 through the first air passage 10c between the vacuum valve portion 31g and the valve seat 10a of the power piston 10, and the second air passage 10d. Large quantities of atmospheric air are introduced into the variable pressure chamber 62, the movable wall 63 is operated toward the left in FIG. 6, and a large brake force is produced.

In the condition in which both the vacuum servo unit 1 is in the operating state by the operation of the input rod 11 and the reaction force from the output rod 21 and the input force from the power piston 10 are being balanced, the vacuum valve portion 31g is in engagement with the valve seat 10a and the communication between the first air passage 10c and the second air passage 10d is cut off. In this condition, the atmospheric air is introduced into the variable pressure chamber 62 through the first air passage 10c and the hole 10e provided in the power piston 10 opening the one way valve 68.

When the driver judges that there is no need for a brake operation and the brake pedal 81 is returned, the first input member 15 moves toward the right according to the returning movement of the second input rod 13 in FIG. 6, and the air valve portion 31f is in engagement with the first input member 15 and the vacuum valve portion 31g is out of engagement with the valve seat 10a of the power piston 10. Thus, communication between the variable pressure chamber 62 and the atmosphere is cut off, and the variable pressure chamber 61 communicates with the negative pressure power source 83 through the constant pressure chamber 61. Thus, the degree of aggressive pressure in the variable pressure chamber 61 decreases and the servo force to the power piston 10 decreases. Thus the brake force decreases.

When the brake operation force applied to the input rod 11 decreases under the pre-set load force of the spring 14, the biasing force of the spring 14 causes the first input rod 11 and the second input rod 13 to separate or move away from one another. Therefore, the contact between the contact portion 17 and the operation portion 16d of the micro switch 16 is canceled, and the electric signal produced by the micro switch 16 ceases. When the micro computer detects that the electric signal of the micro switch 16 is no longer present, the supply of electric power from the electric power source 82 to the solenoid 67f is stopped. Thus, the solenoid 67f does not generate the electromagnetic force to the plunger 67h, and the plunger 67h is returned towards the left in FIG. 6 by the biasing force of the biasing spring 67i. The movement of the plunger 67h toward the left causes the atmosphere valve member 67i to move out of engagement with the constant pressure valve seat 67k towards the left in FIG. 6. Therefore, communication between the variable pressure chamber 62 and the atmosphere is cut off, and the variable pressure chamber 61 communicates with the vacuum source 83 of the vehicle through the constant pressure chamber 61, and so the pressure differential between the variable pressure chamber 62 and the constant pressure chamber 61 decreases. As a result, the operation of the vacuum servo unit comes back to the normal brake operation state, and after this the operation comes back in the first state according to the decrease of the input force.

The other operations and affects are similar to those described above in connection with the first embodiment.

In the third embodiment mentioned above, the variable pressure chamber 62 is blocked from the atmosphere and is communicated with the constant pressure chamber 61 by the operation of the solenoid valve, and so the pressure of the variable pressure chamber is negative pressure in the vacuum servo unit 1. However, the composition of the vacuum servo unit 1 is not limited especially to this composition, for example, in the vacuum servo unit that the variable pressure chamber 62 is directly communicated with the vacuum source by the operation of the solenoid valve actions, effects as well as the third embodiment are gained.

Needless to say the composition of the vacuum servo unit that is capable of automatically operating is not limited this composition.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo unit for a vehicle braking system comprising:
    a housing in which is defined a pressure chamber;
    a movable wall member provided in said housing to divide said pressure chamber into a constant pressure chamber adapted to communicate with a negative pressure source and a variable pressure chamber adapted to selectively communicate with atmosphere or with the negative pressure source;
    a movable power piston integrally connected with said movable wall member;
    an input member provided in said movable power piston and axially movable in response to brake actuation;
    an output member outputting a force in response to movement of said movable power piston accompanying movement of said movable wall;
    a control member for selectively communicating said variable pressure chamber with one of the negative pressure source and the atmosphere according to movement of said input member against said movable power piston;
    an operation member for applying an axial force to said output member when electric power is supplied to the operation member;
    a first input rod having one end portion connected with a brake operation member and an opposite end portion;
    a second input rod having one end portion connected with said input member and an opposite end portion connected with the opposite end portion of said first input rod, the second input rod being constantly disposed in coaxial relationship to the first input rod and being displaceable relative to the first input rod, and said second input rod transmitting force between said input member and said first input rod;
    an electric switch member provided on one of said first input rod and said second input rod, said electric switch member being operable between different states;
    a switch operation member for changing the state of said electric switch member according to movement of said first input rod relative to said second input rod.

2. A vacuum servo unit as claimed in claim 1, wherein said operation member has an electrically operated valve that is electrically connected with an electric power source, and said electrically operated valve is operated in response to an electric power supply to selectively communicate said variable pressure chamber with either said negative pressure source or the atmosphere.

3. A vacuum servo unit as claimed in claim 2, wherein said electrically operated valve is a solenoid valve.

4. A vacuum servo unit as claimed in claim 3, wherein said solenoid valve includes a plunger member which engages said input member and is axially movable in response to movement of said input member to selectively communicate said variable pressure chamber with either said constant pressure chamber in a first state in which said plunger member is in engagement with said control member or the atmosphere is a second state in which said plunger member is out of engagement with said control member, said solenoid valve also including a solenoid which is connected with said electric power source to actuate said plunger member in response to supply of electric power.

5. A vacuum servo unit as claimed in claim 1, wherein said switch operation member includes an elastic member disposed between said first input rod and said second input rod, said elastic member exerting an elastic repulsion force magnitude which determines when the state of said switch member is changed.

6. A vacuum servo unit as claimed in claim 1, wherein one of said first input rod and said second input rod has an axially extending slit, and the other of said first input rod and said second input rod has a hole, said switch operation member comprising a pin member and a switch change member, said pin member being inserted into said one rod and engaging said other rod, said pin member being movable against said one rod, and said switch change member changing the state of said switch member in cooperation with said pin member.

7. A vacuum servo unit as claimed in claim 5, wherein said elastic member projects radially when said elastic member is compressed between said first input rod and said second input rod according to movement of said first input rod against said second input rod.

8. A vacuum servo unit as claimed in claim 1, wherein said control member includes a valve member having a portion that moves into and out of engagement with an end of said power piston, said variable pressure chamber being in communication with the negative pressure source when the portion of the valve member is out of engagement with an end of said power piston.

9. A vacuum servo unit as claimed in claim 1, wherein said control member includes a valve member having a portion that moves into and out of engagement with an end of said power piston, said variable pressure chamber being in communication with the atmosphere when the portion of the valve member is in engagement with the end of said power piston.

10. A vacuum servo unit as claimed in claim 1, including a pair of movable walls provided in said housing and a partition wall member disposed between the pair of movable wall members, said pair of movable walls and said partition wall member dividing said pressure chamber into a pair of constant pressure chambers and a pair of variable pressure chambers.

11. A vacuum servo unit as claimed in claim 1, wherein said opposite end portion of said second input rod has a hollow, the opposite end portion of said first input rod being inserted in said hollow and having an outer periphery that contacts an inner peripheral portion of said hollow.

12. A vacuum servo unit as claimed in claim 1, wherein said electric switch member is located in said movable power piston.

* * * * *